(12) United States Patent
Steinhour

(10) Patent No.: US 8,273,427 B1
(45) Date of Patent: Sep. 25, 2012

(54) COMPOSITE MATERIAL AND SUPPORT STRUCTURE

(76) Inventor: Dirk Steinhour, Lyle, WA (US)

( * ) Notice: Subject to any disclaimer, the term of this patent is extended or adjusted under 35 U.S.C. 154(b) by 658 days.

(21) Appl. No.: 12/462,670

(22) Filed: Aug. 7, 2009

Related U.S. Application Data

(60) Provisional application No. 61/188,423, filed on Aug. 8, 2008.

(51) Int. Cl.
  *B29D 22/00* (2006.01)
  *B29D 23/00* (2006.01)
  *B32B 1/08* (2006.01)

(52) U.S. Cl. ............ 428/35.7; 428/36.1; 428/36.3; 428/36.9; 428/36.91; 428/36.92; 52/1; 52/2.11; 52/63; 52/2.21; 138/93

(58) Field of Classification Search .......... 428/35.7, 428/36.1, 36.3, 36.9, 36.91, 36.92; 52/1, 52/2.11, 63, 2.21; 138/93
See application file for complete search history.

(56) References Cited

U.S. PATENT DOCUMENTS
6,647,668 B1 * 11/2003 Cohee et al. ............ 52/1

* cited by examiner

*Primary Examiner* — Michael C Miggins

(57) ABSTRACT

The present invention is a readily collapsible lightweight, support structure utilizing one or more three dimensional shapes formed from a material exhibiting compressive strength in a high longitudinal to transverse ratio. The composite anisotropic materials preferably comprise a reinforced polymer with continuous, high modulus unidirectional fibers.

16 Claims, 4 Drawing Sheets

COMPOSITE MATERIAL AND SUPPORT STRUCTURE

CROSS-REFERENCE TO RELATED APPLICATIONS

This application is a continuation-in-part of U.S. Provisional Patent Application Ser. No. 61/188,423 filed Aug. 8, 2008.

FIELD OF THE PRESENT INVENTION

The present invention relates generally to structure deriving a significant portion of its structural rigidity from one or more inflatable and collapsible tubes.

BACKGROUND OF THE INVENTION

Many different materials and material configurations have been used to provide strength and structural support to large, portable structures and objects. The portability requires use of a flexible material for it to be folded or rolled for easy transport or storage. Very flexible materials like fabrics can generally have high tensile strength, but the flexible nature that allows folding, rolling and portability indicates that the compressive strength is much less than non-flexible materials.

Some implementations of portable structures employ air-supported elements as a functional structural component. Examples range from U.S. Pat. No. 3,059,657 issued Oct. 23, 1962 to Turner, which discloses a building formed of flexible material that is supported by air pressure within the building to U.S. Pat. No. 3,840,919 issued Oct. 15, 1974 to Middleton, which discloses an inflated tent with hollow ribs having a one-way removable valve. However, despite the ready collapsibility of such approaches, a flexible, conventional material inflated with air can offer only limited structural properties.

In an attempt to overcome some of the deficiencies, other prior art devices have employed means for stiffening the inflatable tubes to provide improved structural support. For example, U.S. Pat. No. 4,514,447 issued Apr. 30, 1985 to Boxmeyer discloses an inflatable structural member that includes resin-impregnated fibers that are cured after the tube is inflated to augment its rigidity. Although successful at providing a more robust structure, such prior art devices cannot be conveniently collapsed for transport, storage or subsequent reuse.

Accordingly, it is an object of the present invention to provide a large inflatable structure that is also easily collapsible while still exhibiting increased rigidity.

It is also an object of the present invention to provide a compact structure that can be inflated for use in a wide variety of portable applications.

A further object of the invention is to provide a sheet material, suitable for incorporation in inflatable or non-inflatable structures, including a unidirectional high (Young's) modulus fiber embedded in a high (Young's) modulus polymer matrix, such that the material exhibits a significantly higher compressive strength along the fiber direction as compared to the perpendicular direction.

SUMMARY OF THE INVENTION

The invention is a support structure comprising opposing thin sheets of composite anisotropic material secured along opposing longitudinal edges, wherein the composite anisotropic material exhibits a modulus of elasticity at least ten times higher in the longitudinal direction than a transverse direction. In one embodiment, the sheets of composite anisotropic material are held in a tubular configuration by a space filing material. Alternatively, the sheets of composite anisotropic material are held in a tubular configuration, sandwiched between an inflated bladder and an encapsulating fabric.

In one embodiment, the sheets of composite anisotropic material are formed by embedding continuous high modulus unidirectional fibers in a polymer matrix. Preferably, the polymer matrix is a thermoplastic, such as a polyethylene terephthalate. Also preferably, the fibers are glass fibers or carbon fibers.

Preferably, the fiber-reinforced composite has a modulus of elasticity of at least approximately $4 \times 10^6$ psi. Alternatively, the fiber-reinforced composite has a modulus of elasticity of at least approximately $15 \times 10^6$ psi. Also preferably, the composite anisotropic material has a density less than approximately 1.80 g/cm$^3$.

In one embodiment, the composite anisotropic material has a fiber volume in the range of approximately 50 to 70%.

In another embodiment, the composite anisotropic material exhibits a modulus of elasticity at least twenty five times higher in the longitudinal direction than a transverse direction.

In yet another aspect of the invention, the thin layer of unidirectional fiber-reinforced polymer composite is laminated to a sheet of isotropic flexible material, such as a fabric or a thermoplastic film.

BRIEF DESCRIPTION OF THE DRAWINGS

Further features and advantages will become apparent from the following and more particular description of the preferred embodiments of the invention, as illustrated in the accompanying drawing, and in which.

DETAILED DESCRIPTION OF THE INVENTION

Figure 1:
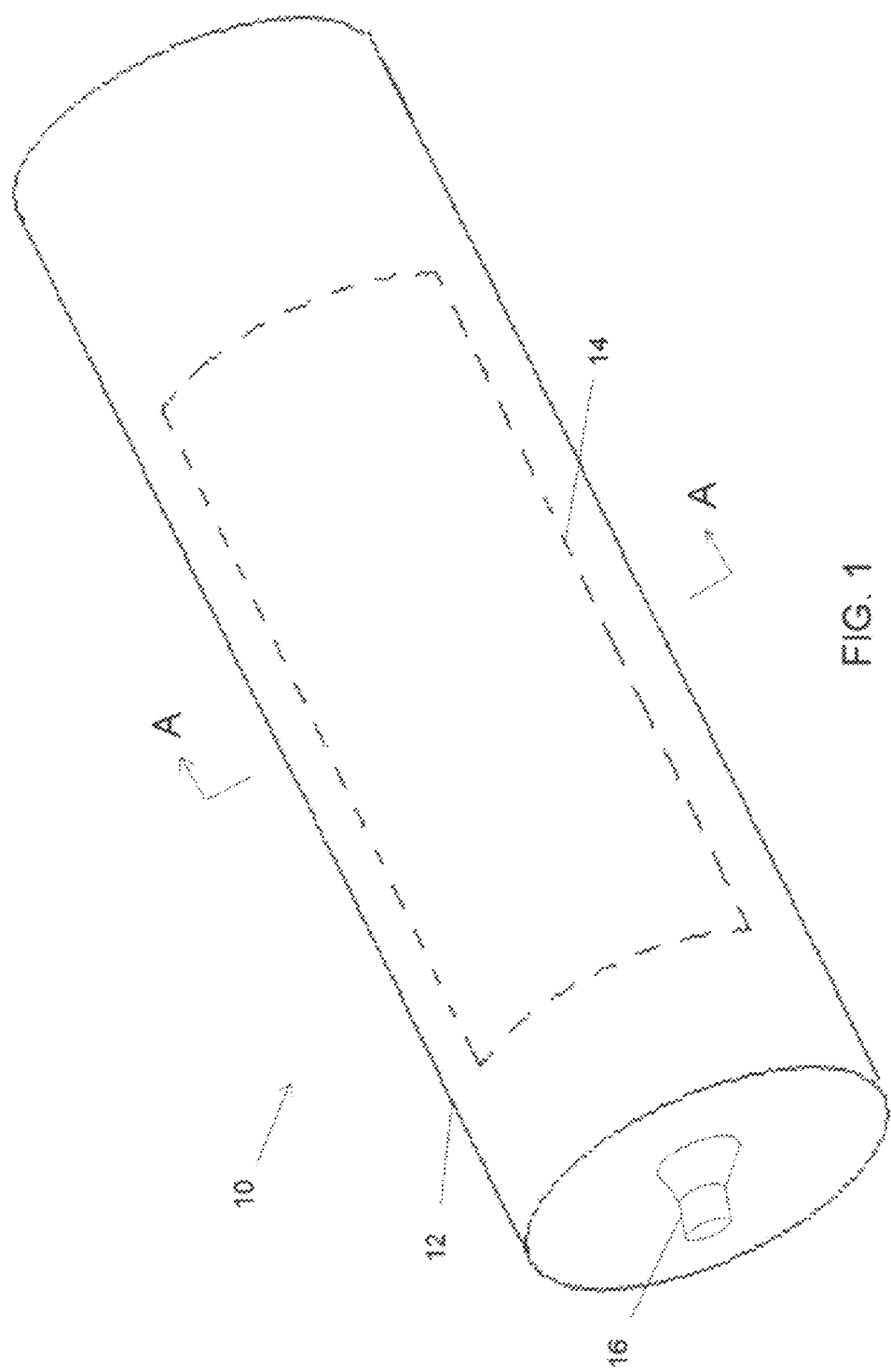
FIG. 1 is an isometric view of an inflatable support device of the invention.

Before describing the present invention in detail, it is to be understood that this invention is not limited to particularly exemplified materials, methods or structures as such may, of course, vary. Thus, although a number of materials and methods similar or equivalent to those described herein can be used in the practice of the present invention, the preferred materials and methods are described herein.

It is also to be understood that the terminology used herein is for the purpose of describing particular embodiments of the invention only and is not intended to be limiting.

Unless defined otherwise, all technical and scientific terms used herein have the same meaning as commonly understood by one having ordinary skill in the art to which the invention pertains.

Further, all publications, patents and patent applications cited herein, whether supra or infra, are hereby incorporated by reference in their entirety.

As used in this specification and the appended claims, the term "modulus of elasticity" is meant to refer to (Young's) modulus, that is, the stiffness of a material.

As used in this specification and the appended claims, the term "stiffening sheet" is meant to refer to an anisotropic material formed by continuous high modulus fibers saturated with and embedded in a polymer matrix.

As used in this specification and the appended claims, the term "composite anisotropic material" is meant to refer to an anisotropic material formed by continuous high modulus fibers saturated with and embedded in a high modulus polymer matrix that is laminated to a flexible fabric or film.

Finally, as used in this specification and the appended claims, the singular forms "a," "an" and "the" include plural referents unless the content clearly dictates otherwise.

In accordance with the above objects and those that will be mentioned and will become apparent below, the present invention is a readily collapsible, lightweight support structure formed from one or more three dimensional shapes formed from a material exhibiting compressive strength in a high longitudinal to transverse ratio. The anisotropic material, having an increased modulus of elasticity along the longitudinal axis relative to the transverse axis, results in a sheet that can readily form a curved profile, while exhibiting greater second moment of area when in that profile. Such anisotropic materials preferably comprise a fiber reinforced polymer as described below, wherein the fibers are preferentially oriented along the longitudinal axis. Preferably, the ratio of the modulus of elasticity along the longitudinal axis to the transverse axis is about 8:1 or greater. More preferably, the ratio is about 10:1 if glass fiber is used as the sheet reinforcement, or 25:1 to 40:1 and greater if carbon fiber is used. In one embodiment, an anisotropic sheet of material for use in the invention has a modulus of elasticity along its transverse axis of about 200,000 and about $4 \times 10^6$ along its longitudinal axis.

Some embodiments of the invention are directed to the use of discrete stiffening sheets mechanically secured, such as by fasteners or a shaped pocket, to a low or negligible modulus flexible material with adequate tensile strength to encapsulate system. In other aspects of the invention, a composite anisotropic material formed by continuous high modulus fibers embedded in a polymer matrix being laminated to flexible sheet, such as a fabric or film, can be used alone; as it comprises the inflatable bladder membrane, the high modulus composite stiffening agent and the encapsulating fabric into one material. When a three dimensional conformation is applied to said flexible anisotropic material, such as by means of fluid or air inflated chambers or other mechanical means, the stiffness of the system increases by as much as 100 times or greater, dependent upon the specific geometry of the three dimensional conformation. The material described is optimized to offer a higher compressive strength as compared to conventional flexible materials used in inflatable structural systems, especially when shaped into a three dimensional structure.

In the design of portable, structural objects, essentially all attempts to make flexible materials that are to be resistant to compression loads placed on the structure or object, can be divided into two categories, materials that contain an internal stiffening ingredient as an integral part of its construction, i.e. laminated, and materials that have a stiffening member separate from said material, but mechanically secured, like battens.

In laminated embodiments, the inventive method of making a material having a thin layer of high (Young's) modulus, continuous fiber-reinforced, high compressive strength composite material as an integral part, yet designed so that it still has a relatively very flexible component when not held in a three dimensional conformation and the material is flattened, to allow for rolling, easy transportation and storage. Furthermore, aligning the high (Young's) modulus fibers primarily along a specified axis will increase structural rigidity and compressive strength in this axis, especially when a curved or corrugated temporary three dimensional conformation is applied by means of inflation or otherwise, yet allow even more flexibility in the transverse axis when the material is flattened.

In one aspect of the invention, the composite material having anisotropic properties is formed from unidirectional high modulus continuous fibers saturated with and embedded in a polymer matrix that are then laminated to a flexible fabric or film. Ideally, the composite is designed with high strength fibers aligned with a defined axis of inflation that makes the material far stiffer than it is normal to this axis, by ten-fold or greater.

As described above, the combination of flexibility in a transverse direction and high compression strength in a longitudinal direction allows for easy application of temporary three dimensional architecture to utilize the axis of high stiffness, giving the overall structure great strength in this same axis, by 100× or greater, dependent upon geometric configuration.

This composite material uses the toughness, adequate tensile strength and flexible nature of fabric as a binder to hold the high modulus unidirectional fibers together in the axis normal to the axis of the inflated chamber. This increases the shear strength of the material along the axis of fiber orientation significantly, and allows the composite to be sewn or welded easily to form inflatable sections, panels or complicated structures. Alternatively, a high shear strength thermoplastic film can be used in place of fabric as the binder for the unidirectional continuous fiber reinforced thermoplastic, offering reduced weight. When coupled to another piece of same material and given temporary three dimensional shape, an inflatable bladder system having significantly increased rigidity and puncture resistance over simple thermoplastic non-fiber reinforced inflatable bladders can be formed.

Furthermore, this unidirectional fiber reinforced material, with fabric binder or thermoplastic film, would have properties that would make it airtight, allowing for the use of two layers, bonded or welded to each other in specific areas, to create the channels for air inflation, and thus the temporary three dimensional shape that will give greater strength and stiffness. These channels could be placed according to a specific arrangement or design to build complex structures using the inflatable mechanism. They can be used to support loads as beams, panels and posts and also used to supply tension to large areas of fabric within the structure. The unidirectional fibers give the inflatable composite high strength as well as increased resistance to puncture and deflation.

Inflated chambers have been used previously to increase rigidity and compressive strength of flexible materials used in portable structures and objects. Many fiber types, engineered fabrics, laminates and composites have been used to increase stiffness of the load carrying sections of large, portable structures, objects and airbeams themselves. The use of anisotropic materials oriented to stiffen a defined axis of inflation provides even more resistance to compression loading over isotropic materials.

This invention improves on this technique significantly in that it utilizes a high (Young's) modulus fiber, saturated with and embedded in a relatively high (Young's) modulus polymer that increases the compression strength of the inflated chamber significantly over previous attempts. The material added is used typically to provide high compressive strength or stiffness to high strength polymer/fiber composite structures, but in this invention the material is used generally in much thinner and fewer layers than these typical composite constructions, and it is used primarily along a defined axis, to create a anisotropic material, so as to allow for a much more flexible material normal to this axis, especially when temporary three dimensional architecture is removed.

The thermoplastic nature of the composite material added allows for simple heat lamination to the fabric binder. The use of a fabric binder with a higher processing temperature than the fiber/polymer composite allows the binder to retain a supple, flexible nature without melting or changing the fabrics innate, flexible, tensile material properties during lamination. The use of a unidirectional, high (Young's) modulus thermoplastic polymer/fiber composite in rolled tape form can allow for simple heat rolling lamination to a fabric or thermoplastic film binder, creating a lower cost material that can be used to create large, portable, high load bearing inflated airbeams, panels, structures and objects.

The invention describes the use of unidirectional high modulus fibers in a thermoplastic polymer composite in order to achieve a high strength, stiff, lightweight material with optimized anisotropic properties where the material is stiffer by a factor of 10 of more in one direction relative to the transverse direction. This material is made using continuous high modulus fibers such as glass and carbon, which are then saturated and embedded in a polymer matrix to achieve approximately a 50-70% fiber volume. The continuous fibers are placed side by side, in the same direction (uni-directional) and then run through a melt process to make the polymer/fiber composite.

In the process, as in most fiber-reinforced composites, the fibers are "wet out" or saturated with a polymer (thermoplastic or thermoset) to achieve even greater stiffness and strength than the fibers have in a dry state or as used in dry laminations or fabrics. As expected, the choice of polymer and fiber dictate the overall resultant properties of the composite. For this application, a relatively high modulus, low cost thermoplastic polymer such as polyethylene terephthalate (PET) is chosen because it allows for the desired complete saturation of the carbon or glass fibers, giving the resulting composite a very high elastic or Young's modulus in the range of $4 \times 10^6$ for glass fiber/PET and $15 \times 10^6$ to $20 \times 10^6$ for carbon fiber/PET. The composite anisotropic materials of the invention can exhibit the desirable structural properties while being very lightweight. For example, an embodiment comprising glass fibers in a PET matrix can have a density of approximately 1.80 $g/cm^3$ and an embodiment comprising carbon fibers in a PET matrix can have a density of approximately 1.58 $gcm^3$ for Carbon/PET.

Due to the composite's thermoplastic nature, it also allows for processing of the material in a secondary heat laminating process where the composite can be laminated to an isotropic fabric or thermoplastic film binder, to give it an encapsulating outer membrane, increased shear strength, toughness and air impermeability. This material is then optimized for use in lightweight, portable inflatable structures and objects when the axis of fiber orientation is also the axis of the temporary three dimensional architecture of inflation.

The composite added in the lamination to the fabric binder is a high strength fiber that has been saturated with a high modulus polymer, ideally carbon or glass fiber, saturated with and embedded in PET or a similar thermoplastic high (Young's) modulus polymer. Multiple layers may be used, and fiber orientation can be unidirectional for lower cost processing or multidirectional for customized applications. Alternatively, pre-consolidated separate sheets may be used to create an assembly that can be taken apart between uses, or the continuous unidirectional fiber reinforced thermoplastic tape may be used and laminated to the binder during a rolling heated lamination process to create an integral structural support.

There are many thermoplastic polymers with high modulus fiber reinforcements that may be laminated to different fabrics or thermoplastic films as a binder that can be used in this material. The invention describes the increased anisotropic nature of this material when temporary three-dimensional architecture is applied, and its subsequent flexibility when three-dimensional shape is removed, and a low cost means of manufacturing high strength portable inflatable structures and objects.

Suitable fibers for use in the system include carbon glass, boron, basalt, and the like. Suitable polymers include PET, PBT, Nylon, PEEK, ABS, PC, PU, UHMWPE, PPS, alloys of these, and others. Thermoset polymers like epoxy and polyester may be used, yet require additional steps to laminate with the fabric or film binders as known in the art. Finally, suitable binder materials include fabrics such as urethane coated Nylon and polyesters, UHMWPE, aramids, polypropylenes and thermoplastic films, such as polyethylene, polypropylene, polyisobutylene, urethane and others.

As illustrated in FIG. 1, the inflatable support device 10 is shown in an isometric view and generally comprises an inflatable tube 12 having one or more stiffening sheets 14 disposed around its radius. Preferably, stiffening sheet 14 has a length substantially longer than its width and is configured so that its length aligns with the longitudinal axis of inflatable tube 12. Gas, air, liquid or other inflation means are introduced through valve 16 to the interior of tube 12. In a preferred embodiment, tube 12 has a generally cylindrical configuration when inflated. In other embodiments, tube 12 can be configured to undertake different geometries.

As is known in the art, the second moment of area of a given material over its longitudinal axis increases substantially when the material assumes a curved profile along its transverse axis. This effect is maximized when the material assumes a cylindrical profile. By orienting stiffening sheet 14 longitudinally along inflatable tube 12, the inflation of tube 12 imparts such a curved profile to stiffening sheet 14, greatly increasing the second moment of area of the support device 10. Correspondingly, when inflatable tube 12 is deflated, stiffening sheet 14 can assume a substantially planar profile, allowing it to be rolled, folded or otherwise compressed along its longitudinal axis. Preferably, stiffening sheet 14 comprises unidirectional high modulus fibers in a thermoplastic polymer composite in order to achieve a high strength, stiff, lightweight material having the desired anisotropic properties.

Figure 2:
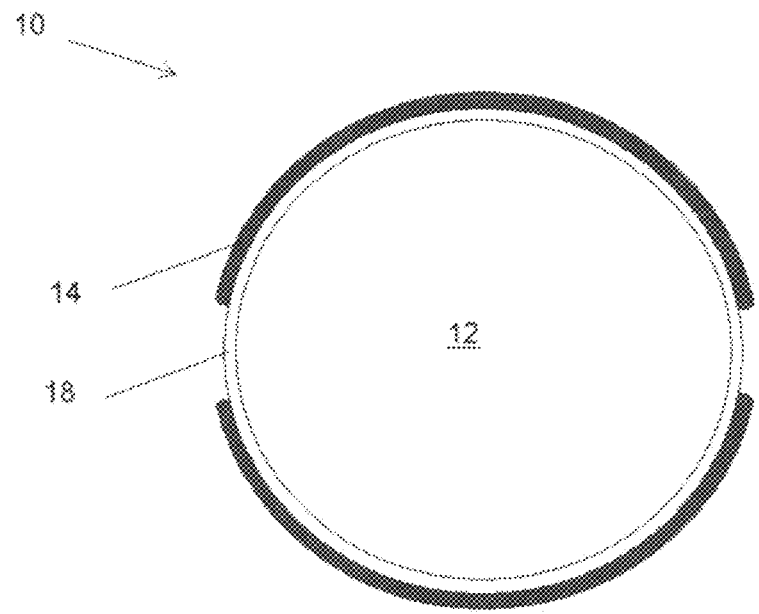
FIG. 2 is a cross sectional view taken at line A-A of FIG. 1 of the inflatable support device; according to the invention.
Figure 3:
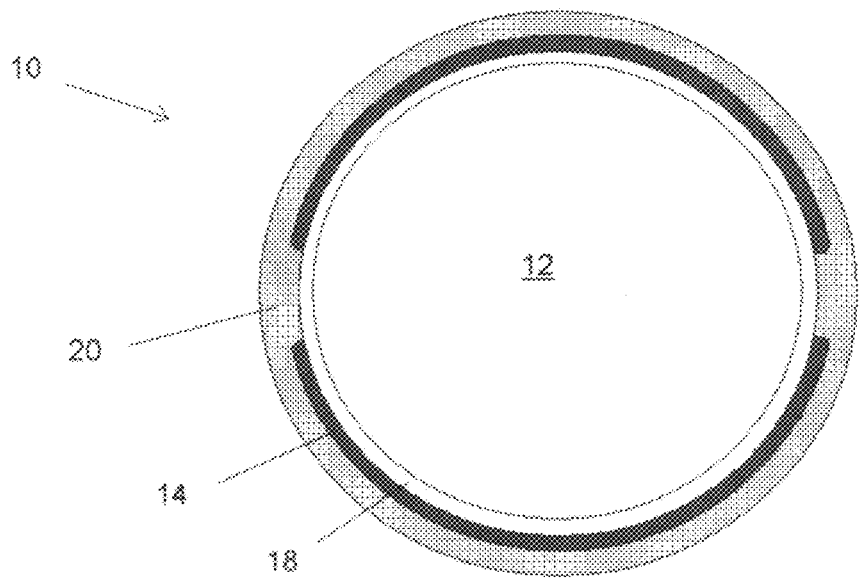
FIG. 3 is a cross sectional view of an alternate embodiment of the invention, corresponding to FIG. 2.

The embodiment of the invention depicted in FIG. 2 is a cross section taken at line A-A from FIG. 1. As shown, inflatable support device 10 comprises an air tight bladder 18 with two stiffening sheets 14 disposed symmetrically around its radius. In this embodiment, stiffening sheets 14 are secured to bladder 18 with a suitable adhesive. Other means for securing sheets 14 to the bladder 18 include forming pockets in the bladder material to receive the sheets or laminating sheets 14 to the bladder or the encapsulating fabric. In general, any method of securing sheets 14 to bladder 18 can be used so long as inflation of bladder 18 urges the sheets 14 into a curved profile. For example, FIG. 3 shows an alternate cross section in which sheets 14 are captured between bladder 18 and exterior encapsulating fabric 20.

As one having skill in the art will appreciate, the structural properties of inflatable support 10 can be tailored in numerous ways. For example, the intrinsic properties of the material used for stiffening sheets 14 will have a direct impact on the performance of the inflatable support. Further, the inflation pressure used will also effect of the overall strength of the support. With regard to the cross sections shown in FIGS. 2 and 3, the percentage of the circumference of inflatable tube 12 comprising stiffening sheets 14 will also dramatically affect the resulting stiffness of the inflated support. In general, the greatest strength is achieved by configuring the stiffening sheets 14 to approximate a cylinder when tube 12 is in its inflated profile. In one embodiment, this comprises the use of two stiffening sheets disposed on either side of bladder 18 and occupying the maximum amount of the circumference possible while still permitting the tube to relax to a flat state when deflated. In other embodiments, however, it may be desirable to modify the properties of the inflatable support tube by varying the number and placement of stiffening sheets 14 as well as the overall percentage of the circumference comprising stiffening sheets 14.

Figure 4:
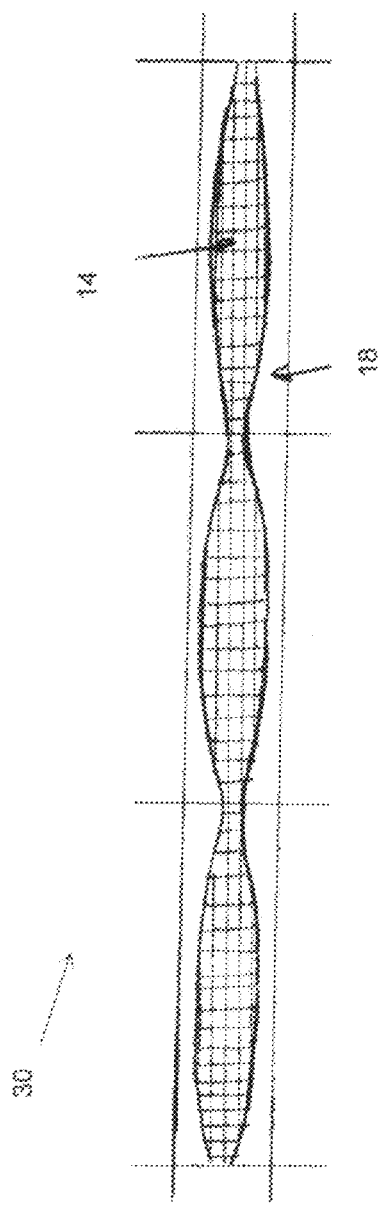
FIG. 4 is a partial view of another embodiment of the invention, showing an inflatable support device capable of assuming a curved configuration, in its deflated state.
Figure 5:
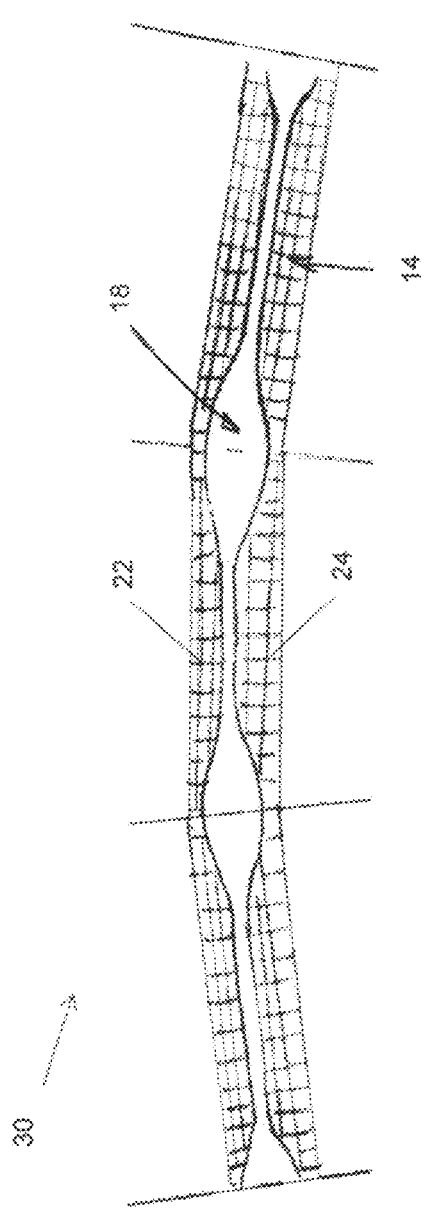
FIG. 5 is a partial view of the embodiment shown in FIG. 4, in its inflated state.

In a further embodiment of the invention, the configuration of stiffening sheets 14 allows the longitudinal axis of inflatable tube 12 to have a curved profile. FIG. 4 shows a partial view of an inflatable support 30 that features a stiffening sheet 14 having a width that varies along the longitudinal axis. In FIG. 4, inflatable support 30 is deflated with stiffening sheet flat along the top surface so that it can be easily rolled up. FIG. 5 shows inflatable support in its inflated configuration, and support 30 has been rotated 90° so that a top stiffening sheet 22 and a bottom stiffening sheet 24 can be seen. By tailoring the width of top sheet 22 and bottom sheet 24 along the longitudinal axis, the curved profile shown can be achieved when inflatable support 30 is inflated. Preferably, the curved profile is achieved through a plurality of relatively straight chords where the width of top sheet 22 and bottom sheet 24 are relatively wider connected by nodes where the width of top sheet 22 and bottom sheet 24 are relatively narrower.

Stiffening sheets 14 are preferably formed from a thermoplastic or thermoset polymer, most preferably thermoplastic. In presently preferred embodiments, the thermoplastic polymers comprise polyethylene terephthalate, polypropylene, acrylonitrile butadiene styrene, or polyvinylchloride. Sheets 14 are preferably about 0.125 inch thick or less. Also preferably, the polymer is fiber reinforced and preferably, reinforced with a relatively long or more preferably a continuous fiber, such as 0.25 inch or greater. Preferred materials for fiber reinforcement are any relatively high modulus fiber such as carbon or glass.

As will be appreciated by one having skill in the art, in addition to sheets 14, bladder 18 and/or exterior 20 can comprise any suitable polymeric material, including plastics and rubber. Examples of suitable plastics include polyethylenes, such as low density, medium density, high density and linear low density polyethylenes, polypropylenes, such as homopolymer and co-polymer propylenes, nylons, polyurethanes, such as polyester based and polyether based polyurethanes, vinyls, thermoplastic fluoropolymers, such as polyvinylidene fluoride and polytetrafluoroethylene, polyethylene terephthalate, polyisobutylene, PVC and the like. Preferably, at least one component of inflatable tube 12 is relatively inelastic so that it will assume a defined configuration when inflated and will resist deformation when bending stresses are applied. So long as one or more layers of inflatable tube 12 are relatively inelastic, certain embodiments of the invention employ a bladder 18 formed from an elastomeric compound, including natural rubbers like latex, butyl rubber, polyvinyl chloride and other forms of synthetic rubbers or elastomeric materials to facilitate retention of the inflation gas.

As described above, stiffening sheet 14 remains relatively flexible when inflatable tube 12 is deflated and sheet 14 has a relatively flat or planar profile. Preferably, this allows inflatable support 10 to be rolled up into a compressed configuration. In one embodiment, inflatable support 10 can be rolled with a 12 inch radius or less. In another embodiment, inflatable support 10 can be rolled with a 5 inch radius or less.

In the above embodiments of the invention, tubular members having a generally cylindrical shape are employed. The relatively high compressive strength in the longitudinal direction allows such tubes, when inflated, to exhibit superior structural properties. For example, the elastic deflection, under load, of a cantilevered tube member is given by the equation $$f_B = F \cdot L^3 / (3 \cdot E \cdot I)$$

where
F=force acting on the tip of the beam
L=length of the beam (span)
E=modulus of elasticity
I=area moment of inertia As will be appreciated, the resistance to deflection is directly proportional to the modulus of elasticity. Thus, the use of a composite anisotropic material having a very high modulus of elasticity in the longitudinal direction of the inflated assembly creates a structural member with good column strength when inflated, while still enjoying flexibility when deflated.

Figure 6:
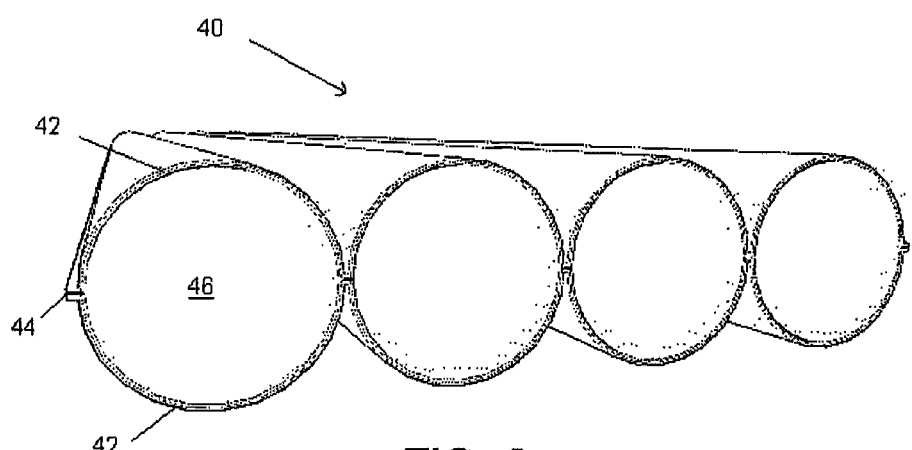
FIG. 6 is an end view of a tubular support structure formed from two sheets of composite anisotropic material, according to the invention.
Figure 7:
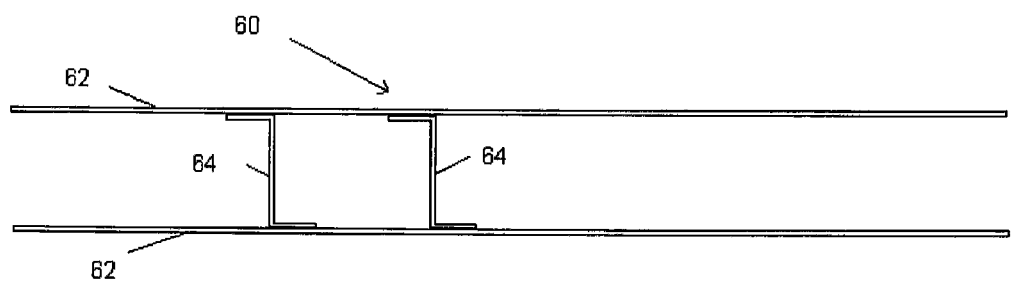
FIG. 7 is a cross sectional view of a rectangular support structure formed from two sheets of composite anisotropic material and sidewalls, according to the invention.

Other suitable configurations include chambers having generally square or rectangular cross section, formed with sidewalls, or a corrugated conformation imparted by suitable inflated or non-inflated, such as foam, structures. For example, as shown in FIG. 6, a tubular support 40 is shown in end view, and is formed by two sheets 42 of composite anisotropic material that are secured along their edges 44 by any suitable means, such as adhesive, radio frequency or thermal welding. Support 40 is maintained in a tubular three dimensional configuration by inflation or other suitable material. In yet another embodiment, shown in cross section in FIG. 7, support structure 60 is formed from two sheets of composite anisotropic material 62 having side wall members 64. Each pair of sidewall members (only two shown) create a chamber 66 which can be inflated or otherwise supported in the desired three dimensional configuration to provide enhanced longitudinal stiffness.

Described herein are presently preferred embodiments, however, one skilled in the art that pertains to the present invention will understand that there are equivalent alternative embodiments. In particular, the inflatable support devices described above are particularly suited for recreational products, floating inflatable structures, inflatable flying structures, inflatable home products, inflatable buildings, portable, structural pipes and tubing, aircraft, travel luggage, lightweight, reusable shipping containers and packaging, watercraft, non inflated structures and buildings and inflatable emergency evacuation chutes.

However, the principles can be used in any suitable application. As such, changes and modifications are properly, equitably, and intended to be, within the full range of equivalence of this disclosure.

The invention claimed is:

1. A support structure comprising opposing sheets of composite anisotropic material secured along opposing longitudinal edges, wherein the composite anisotropic material exhibits a modulus of elasticity at least ten times higher in the longitudinal direction than a transverse direction.

2. The support structure of claim 1, wherein the sheets of composite anisotropic material are held in a tubular configuration by a space filling material.

3. The support structure of claim 1, wherein the sheets of composite anisotropic material are held in a tubular configuration by inflation.

4. The support structure of claim 1, wherein the sheets of composite anisotropic material comprise continuous high modulus unidirectional fibers saturated with and embedded in a polymer matrix.

5. The support structure of claim 4, wherein the polymer matrix is a thermoplastic.

6. The support structure of claim 5, wherein the thermoplastic is a polyethylene terephthalate.

7. The support structure of claim 6, wherein the fibers are glass fibers.

8. The support structure of claim 6, wherein the fibers are carbon fibers.

9. The support structure of claim 4, wherein the composite anisotropic material has a modulus of elasticity of at least approximately $4 \times 10^6$ psi.

10. The support structure of claim 4, wherein the composite anisotropic material has a modulus of elasticity of at least approximately $15 \times 10^6$ psi.

11. The support structure of claim 4, wherein the composite anisotropic material has a density less than approximately 1.80 g/cm$^3$.

12. The support structure of claim 4, wherein the composite anisotropic material has a fiber volume in the range of approximately 50 to 70%.

13. The support structure of claim 1, wherein the composite anisotropic material exhibits a modulus of elasticity at least twenty five times higher in the longitudinal direction than a transverse direction.

14. The support structure of claim 4, wherein the fiber embedded polymer matrix is laminated to a sheet of isotropic flexible material.

15. The support structure of claim 14, wherein the isotropic flexible material comprises a fabric.

16. The support structure of claim 14, wherein the isotropic flexible material comprises a thermoplastic film.

* * * * *